(12) United States Patent
Iwai et al.

(10) Patent No.: US 11,400,591 B2
(45) Date of Patent: Aug. 2, 2022

(54) CONTROL DEVICE OF ROBOT AND CONTROL METHOD OF ROBOT

(71) Applicant: OMRON Corporation, Kyoto (JP)

(72) Inventors: Yosuke Iwai, Kyoto (JP); Masahiro Murai, Kyoto (JP); Kazuhiro Takizawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 285 days.

(21) Appl. No.: 16/248,802

(22) Filed: Jan. 16, 2019

(65) Prior Publication Data
US 2019/0283250 A1 Sep. 19, 2019

(30) Foreign Application Priority Data
Mar. 14, 2018 (JP) .............................. JP2018-047230

(51) Int. Cl.
| | | |
|---|---|---|
| B25J 9/16 | (2006.01) | |
| B25J 11/00 | (2006.01) | |
| B25J 13/08 | (2006.01) | |

(52) U.S. Cl.
CPC ........... *B25J 9/1633* (2013.01); *B25J 9/1687* (2013.01); *B25J 11/005* (2013.01); *B25J 13/085* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,224,137 B1 | 12/2015 | Tomasi et al. | |
| 2002/0056181 A1* | 5/2002 | Sakakibara | B25J 9/1687 29/407.01 |
| 2004/0102862 A1* | 5/2004 | Kato | B23P 19/107 700/95 |
| 2011/0225787 A1* | 9/2011 | Sato | B25J 9/1687 29/407.01 |

(Continued)

FOREIGN PATENT DOCUMENTS

| | | |
|---|---|---|
| CN | 101034283 | 9/2007 |
| CN | 103203755 | 7/2013 |

(Continued)

OTHER PUBLICATIONS

"Search Report of Europe Counterpart Application", dated Jul. 19, 2019, pp. 1-9.

(Continued)

*Primary Examiner* — Jeff A Burke
*Assistant Examiner* — Zachary Joseph Wallace
(74) *Attorney, Agent, or Firm* — JCIPRNET

(57) ABSTRACT

The disclosure is provided to shorten a total allowed cycle time of insertion or a press-fitting operation. A control device of a robot performing insertion or a press-fitting operation includes: a measuring part, measuring an elapsed time from a time point of starting a correcting operation in a case where the insertion or the press-fitting operation does not end normally; a calculating part, calculating a total remaining time of the correcting operation by subtracting a time from a start to an end of the correcting operation from a preset total allowed time of the correcting operation; a comparing part, comparing the remaining time with a required operation time which is an elapsed time from the start to the end of the correcting operation; and a control part, interrupting the correcting operation before the allowed time elapses in a case where the remaining time is less than the required operation time.

3 Claims, 3 Drawing Sheets

(52) U.S. Cl.
CPC ............. *G05B 2219/39529* (2013.01); *G05B 2219/40032* (2013.01); *G05B 2219/45063* (2013.01); *G05B 2219/45064* (2013.01)

(56) References Cited

U.S. PATENT DOCUMENTS

| | | | |
|---|---|---|---|
| 2014/0188281 A1* | 7/2014 | Nagai | B25J 9/0081 |
| | | | 700/264 |
| 2015/0174760 A1* | 6/2015 | Fukuda | B25J 9/1633 |
| | | | 700/260 |
| 2017/0015002 A1* | 1/2017 | Ito | B25J 9/1687 |
| 2018/0345503 A1* | 12/2018 | De Magistris | B25J 9/1687 |
| 2019/0047096 A1* | 2/2019 | Haruna | B23P 19/04 |
| 2019/0077017 A1* | 3/2019 | Shimodaira | B25J 9/1692 |
| 2019/0126483 A1* | 5/2019 | Haddadin | B25J 9/1633 |

FOREIGN PATENT DOCUMENTS

| | | |
|---|---|---|
| JP | H11123683 | 5/1999 |
| JP | 2008264910 | 11/2008 |
| JP | 2015157340 | 9/2015 |
| WO | 2012137409 | 10/2012 |

OTHER PUBLICATIONS

"Office Action of Japan Counterpart Application", dated Jan. 26, 2021, with English translation thereof, p. 1-p. 6.
"Office Action of China Counterpart Application" with English translation thereof, dated Nov. 29, 2021, p. 1-p. 17.

* cited by examiner

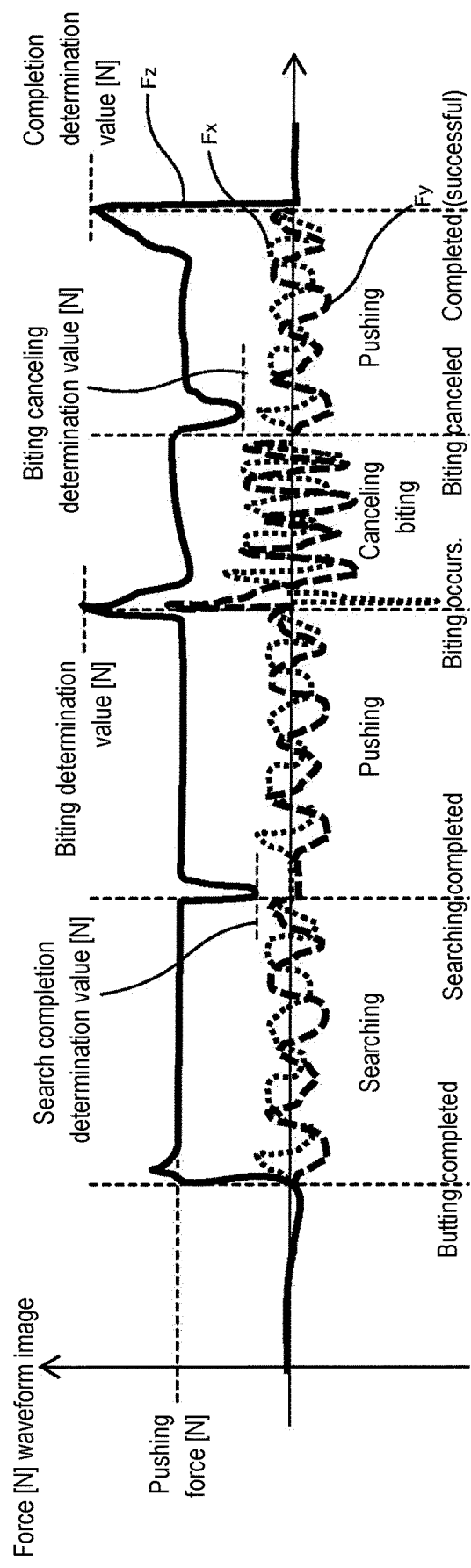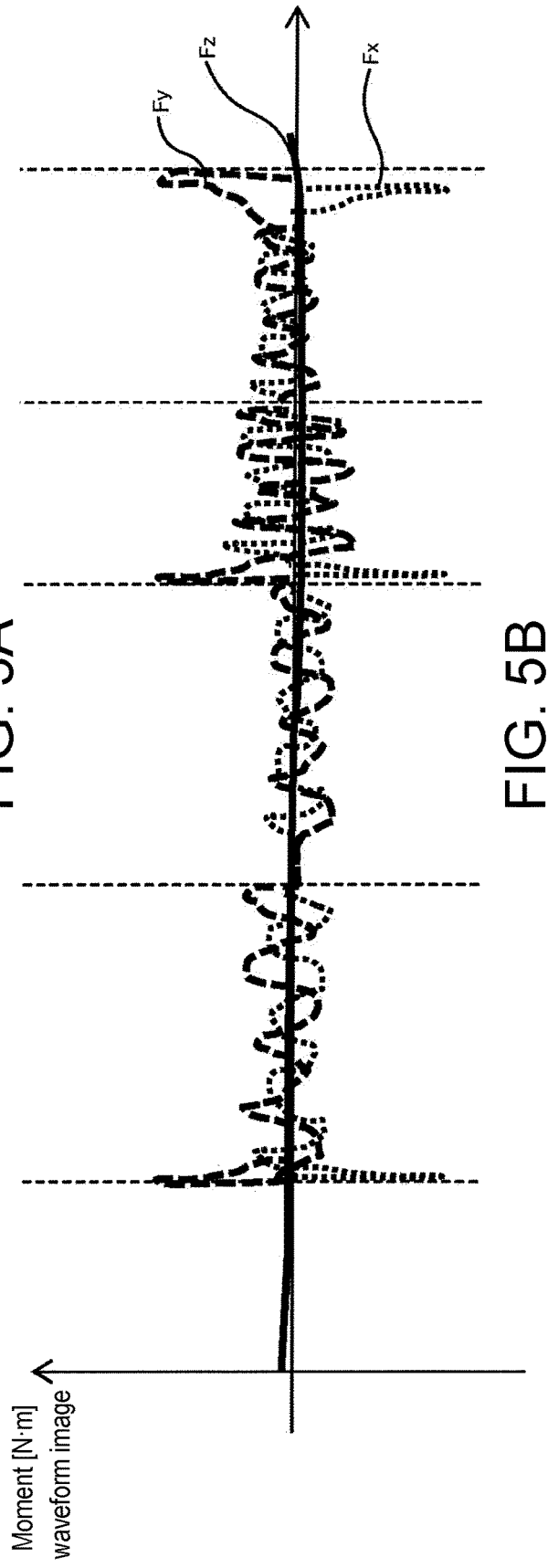

CONTROL DEVICE OF ROBOT AND CONTROL METHOD OF ROBOT

CROSS-REFERENCE TO RELATED APPLICATION

This application claims the priority benefit of Japan application serial no. 2018-047230, filed on Mar. 14, 2018. The entirety of the above-mentioned patent application is hereby incorporated by reference herein and made a part of this specification.

BACKGROUND

Technical Field

The disclosure relates to a control device of a robot and a control method of a robot.

DESCRIPTION OF RELATED ART

Patent Document 1 discloses a control method of a robot that performs a fitting operation. In this method, when a predetermined operation is not completed within a predetermined time, a correcting operation, which is another control, is performed. Here, the correcting operation refers to a correcting operation in the case where an operation such as insertion or press-fitting does not end normally.

RELATED ART

Patent Document(s)

[Patent Document 1] Japanese Laid-open No. 2015-157340

However, the determination made in the method of Patent Document 1 is a determination for performing the correcting operation, and in some cases, the allowed cycle time, which is the total operation time, is increased.

SUMMARY

Therefore, the disclosure provides a control device and a control method of a robot that can shorten the allowed cycle time, which is the total operation time, even in the case where the correcting operation is performed.

A control device of a robot that performs insertion or a press-fitting operation according to the disclosure includes a measuring part, a calculating part, a comparing part, and a control part. The measuring part measures an elapsed time from a time point of starting a correcting operation in a case where the insertion or the press-fitting operation does not end normally. The calculating part calculates a total remaining time of the correcting operation by subtracting a time from a start to an end of the correcting operation from a preset total allowed time of the correcting operation. The comparing part compares the remaining time with a required operation time which is an elapsed time from the start to the end of the correcting operation. The control part interrupts the correcting operation before the allowed time elapses in a case where the remaining time is less than the required operation time.

A control method of a robot that performs insertion or a press-fitting operation according to the disclosure includes: a step of measuring an elapsed time from a time point of starting a correcting operation in a case where the insertion or the press-fitting operation does not end normally; a step of calculating a total remaining time of the correcting operation by subtracting a time from a start to an end of the correcting operation from a preset total allowed time of the correcting operation; a step of comparing the remaining time with a required operation time which is an elapsed time from the start to the end of the correcting operation; and a step of interrupting the correcting operation before the allowed time elapses in a case where the remaining time is less than the required operation time.

BRIEF DESCRIPTION OF THE DRAWINGS

FIG. 5A and FIG. 5B are diagrams showing a waveform image of a force obtained from an output value of a force sensor.

DESCRIPTION OF THE EMBODIMENTS

In the control device of a robot described above, the elapsed time from the time point of starting the correcting operation in the case where the insertion or the press-fitting operation does not end normally is measured by the measuring part. Also, the total remaining time of the correcting operation is calculated by the calculating part by subtracting the time from the start to the end of the correcting operation from the preset total allowed time of the correcting operation. Then, the remaining time is compared with the required operation time, which is the elapsed time from the start to the end of the correcting operation, by the comparing part. The control part interrupts the correcting operation before the allowed time elapses in the case where the remaining time is less than the required operation time.

Therefore, according to the control device described above, it is possible to shorten the total allowed cycle time of the insertion or the press-fitting operation even in the case where the correcting operation is performed.

The control device of an embodiment includes a force sensor, and the start and the end of the correcting operation are determined based on a value detected by the force sensor.

In the control device of this embodiment, since the start and the end of the correcting operation are determined based on the value detected by the force sensor, the elapsed time, the remaining time, and the required operation time can be precisely determined.

In the control device of an embodiment, the correcting operation includes a searching operation of searching for an insertion position or a press-fitting position, and a biting canceling operation of canceling biting of a workpiece during insertion or press-fitting.

In the control device of this embodiment, even in the case of performing the correcting operation including the searching operation of searching for the insertion position or the press-fitting position and the biting canceling operation of canceling biting of the workpiece during insertion or press-fitting, it is possible to shorten the total allowed cycle time of the insertion or the press-fitting operation.

According to the control method of the disclosure, it is possible to shorten the total allowed cycle time of the insertion or the press-fitting operation even in the case where the correcting operation is performed.

As is apparent from the above, according to the control device and the control method of a robot of the disclosure, it is possible to shorten the total allowed cycle time of the insertion or the press-fitting operation even in the case where the correcting operation is performed.

Hereinafter, embodiments of the disclosure will be described in detail with reference to the drawings.

Figure 1:
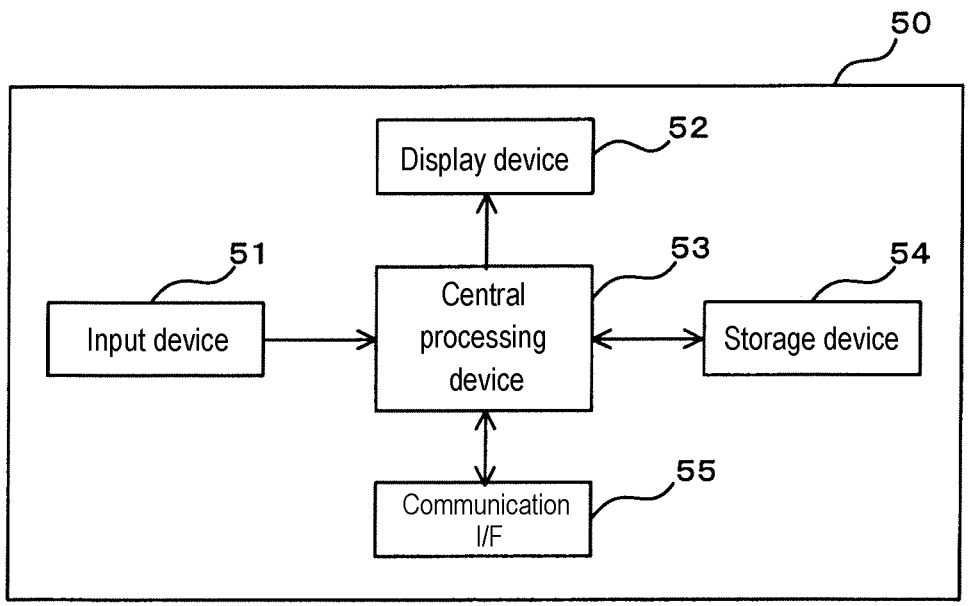
FIG. 1 is a diagram showing a hardware configuration of a control device of a robot according to an embodiment.

FIG. 1 is a block diagram showing a schematic configuration of a control device 50 of a robot according to an embodiment of the disclosure. The control device 50 of the present embodiment is, for example, a control device of an arm-type robot that inserts or press-fits a workpiece. For example, a 6-axis vertical articulated robot is used as the arm-type robot. The arm-type robot has a power source such as a servomotor and drives the servomotor according to a control signal output from the control device 50 based on a robot control program to operate each joint axis.

An end effector is attached to the distal end part of the arm-type robot and has a mechanism or the like for gripping the workpiece. A force sensor is attached to the end effector, and, at the time of insertion or press-fitting, the pressure applied to the workpiece is detected by the force sensor and the detected value is input in the control device 50. The end effector is communicably connected to the control device 50 via an end effector controller. The end effector controller outputs a control signal based on the control of the control device 50, and the end effector drives a servomotor in the end effector based on the control signal output from the end effector controller and performs an operation such as gripping of the workpiece.

As shown in FIG. 1, the control device 50 of the present embodiment includes an input device 51, a display device 52, a central processing device 53, a storage device 54, and a communication I/F 55. The input device 51 is constituted by a keyboard, etc. as an example. The display device 52 is constituted by a display as an example. The central processing device 53 is constituted by a CPU as an example. The storage device 54 includes a nonvolatile storage device and a volatile storage device, and the nonvolatile storage device stores a robot control program, a sequence control program, etc. The volatile storage device is appropriately used as a work memory at the time of execution of the central processing device 53. The communication I/F 55 is, for example, an interface of a serial line such as RS232C and communicates with the arm-type robot and the end effector controller. The communication I/F 55 may also be an interface of another communication line.

Figure 2:
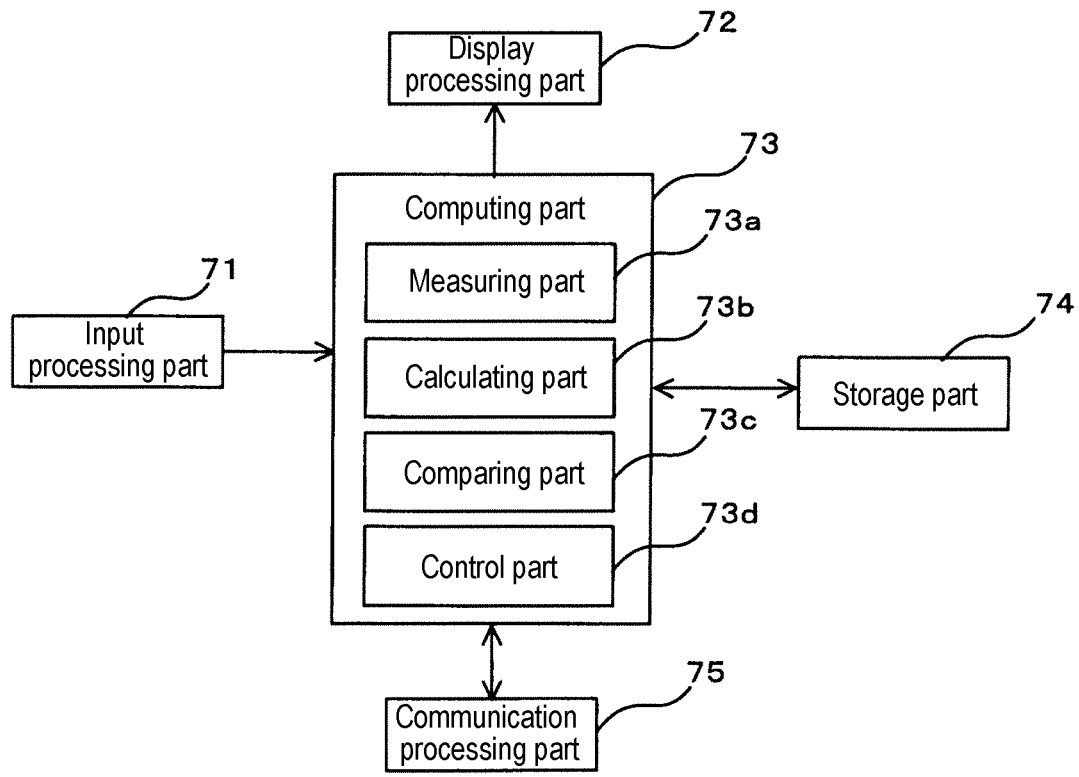
FIG. 2 is a functional block diagram of the control device and is a diagram showing a hardware configuration.

FIG. 2 is a functional block diagram of the control device 50 according to the present embodiment. The control device 50 functions as an input processing part 71, a display processing part 72, a computing part 73, a storage part 74, and a communication processing part 75. The input processing part 71 processes the input from the input device 51. The display processing part 72 creates display data to be output to the display device 52. The computing part 73 includes a measuring part 73a, a calculating part 73b, a comparing part 73c, and a control part 73d. Details of the functions of the computing part 73 will be described later. The storage part 74 stores the robot control program, the sequence control program, etc.

Figure 3:
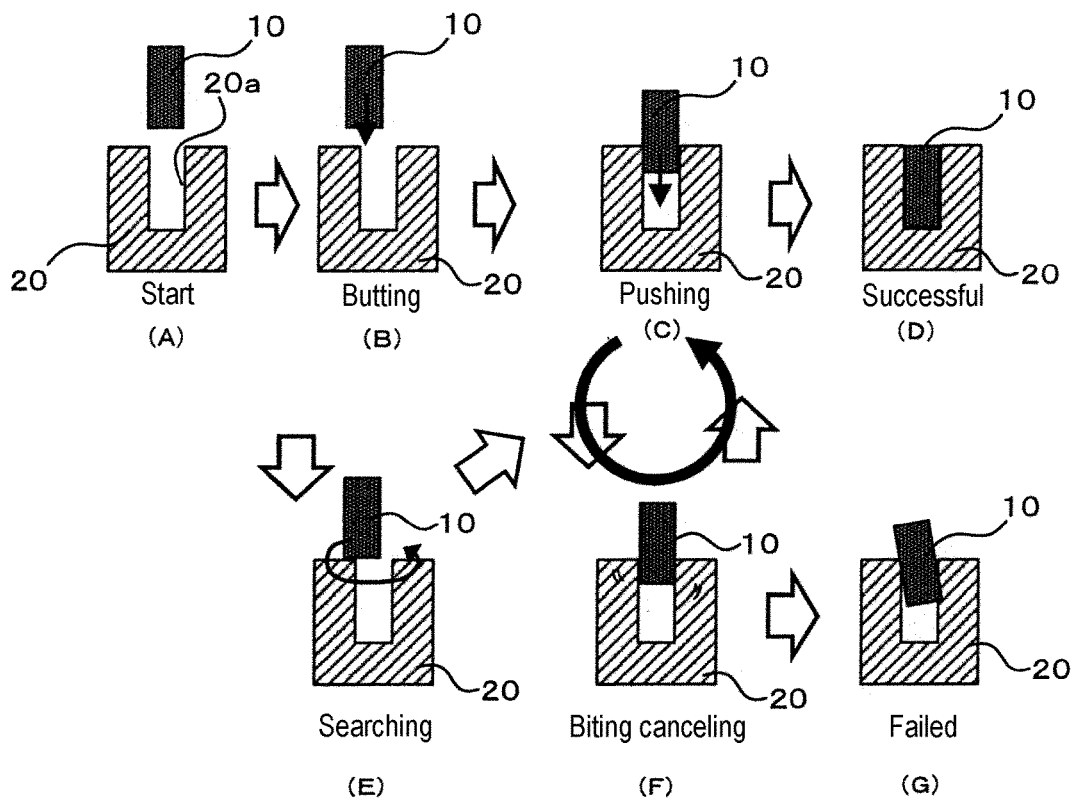
FIG. 3 is a diagram illustrating a process of performing a press-fitting operation of a workpiece.
Figure 4A:
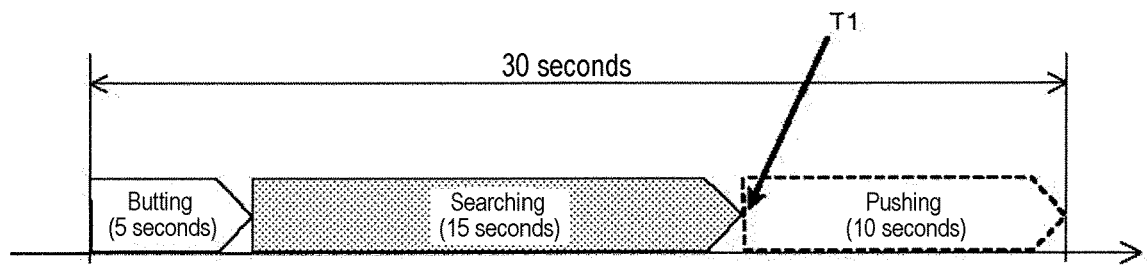
FIG. 4A, FIG. 4B and FIG. 4C are diagrams illustrating interruption processing of a correcting operation.
Figure 4B:
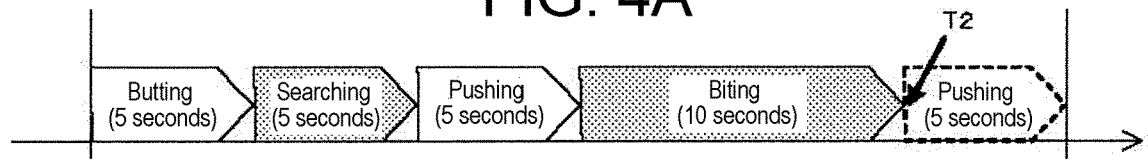
Figure 4C:
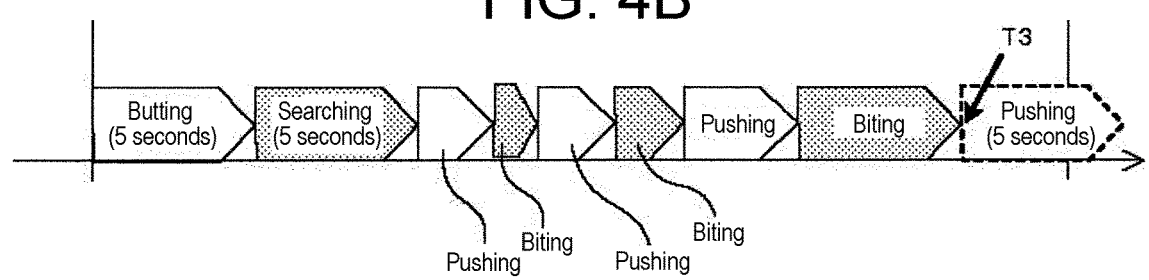

FIG. 3 is a diagram illustrating a process of performing a press-fitting operation of a workpiece according to the present embodiment. FIG. 4A to FIG. 4C are diagrams illustrating interruption processing of a correcting operation according to the present embodiment. FIG. 5A and FIG. 5B are diagrams showing a waveform image of a force obtained from an output value of the force sensor according to the present embodiment. In the present embodiment, as an example, the case where a pin for positioning such as a knock pin, etc. is press-fit as a workpiece 10 into a hole part 20a of a cast product 20 such as an engine will be described.

The control device 50 causes the end effector of the arm-type robot to grip the workpiece 10 and convey the workpiece 10 to the start position as shown in part (A) of FIG. 3. Next, the control device 50 causes the workpiece 10 to move in the Z direction and performs a butting operation to butt the bottom surface of the workpiece 10 against the top surface of the cast product 20. The control device 50 inputs the output value from the force sensor and determines that the butting operation is completed when the moment in the X direction and the Y direction becomes the maximum as shown in FIG. 5B. In FIG. 5A and FIG. 5B, Fx represents the force in the X direction, Fy represents the force in the Y direction, and Fz represents the force in the Z direction.

When the butting operation is completed, the control device 50 starts a pushing operation to push the workpiece 10 into the hole part 20a of the cast product 20 as shown in part (C) of FIG. 3, and at this moment, in the case where it is determined that the position of the workpiece 10 in the X direction and the Y direction does not come to the press-fitting position corresponding to the hole part 20a, a searching operation shown in part (E) of FIG. 3 is started. The searching operation is an operation of moving the workpiece 10 in the X direction and the Y direction so that the position of the workpiece 10 in the X direction and the Y direction comes to the press-fitting position corresponding to the hole part 20a, and is one correcting operation.

As shown in FIG. 5A, the control device 50 determines that the searching operation is completed when the pushing force detected based on the force sensor reaches a preset search completion determination value. When the searching operation is completed, the control device 50 starts the pushing operation shown in part (C) of FIG. 3. When the pushing operation is completed, the press-fitting operation is successful as shown in part (D) of FIG. 3.

However, in reality, as the size of the workpiece 10 and the size of the hole part 20a are almost the same and there is no margin, due to the inclination of the workpiece 10, etc., the workpiece 10 is not pushed straight into the hole part 20a, and a so-called biting phenomenon occurs. As shown in FIG. 5A, the control device 50 determines that biting occurs when the pushing force detected based on the force sensor reaches a preset biting determination value. When the biting occurs, as shown in part (G) of FIG. 3, the press-fitting operation fails.

Therefore, as shown in part (F) of FIG. 3, the control device 50 performs an operation of canceling biting, for example, by swinging the workpiece 10 in the X, Y, and Z directions. The operation of canceling biting is also one correcting operation. As shown in FIG. 5A, when the pushing force detected based on the force sensor reaches a preset biting canceling determination value, the control device 50 determines that the biting is canceled. When the control device 50 determines that the biting is canceled, as shown in part (F) of FIG. 3, the pushing operation is performed again. In this way, the pushing operation shown in part (C) of FIG. 3 and the biting canceling operation shown in part (F) of FIG. 3 are sometimes repeated.

When the biting is canceled and the pushing force detected based on the force sensor reaches a preset biting completion determination value, the control device 50 determines that the whole press-fitting operation is completed.

However, it is uncertain how much time the searching operation and the biting canceling operation described above would take, and if these operations take a long time, the cycle period from the start to the completion of the press-fitting operation becomes long.

Therefore, in the present embodiment, the following interruption processing of the correcting operation is performed. In the present embodiment, a total allowed time of the correcting operation is set, and in the case where a remaining time obtained by subtracting the time from the start to the end of at least one correcting operation from this allowed time becomes less than the time required for an unfinished correcting operation, the correcting operation is interrupted.

FIG. 4A, FIG. 4B, and FIG. 4C show examples of interruption processing of the correcting operation according to the present embodiment. In any case, the allowed cycle time, which is the time for the whole press-fitting operation to be completed, is set to 30 seconds as an example. The standard working time of the butting operation is set to 5 seconds as an example, and the standard working time of the pushing operation is set to 5 seconds as an example. Also, the total allowed time of the correcting operation including the searching operation and the biting canceling operation is set to 15 seconds as an example.

In the example shown in FIG. 4A, the butting operation is completed in 5 seconds as the standard time, and then the searching operation is started. The measuring part 73a of the control device 50 measures an elapsed time from the time point of start of the searching operation.

Assuming that the searching operation is completed in 15 seconds as shown in FIG. 4A, the calculating part 73b of the control device 50 subtracts the required operation time, which is the elapsed time from the start to the end of the searching operation, from 15 seconds, which is the preset total allowed time of the correcting operation, and calculates a total remaining time of the correcting operation. In this case, the remaining time is 0 seconds.

Then, the comparing part 73c of the control device 50 compares the remaining time with the required operation time of the butting operation. Since the remaining time is less than the required operation time, the control part 73d of the control device 50 detects an error at the timing T1 shown in FIG. 4A and interrupts the searching operation. As a result, it is possible to prevent an increase in the allowed cycle time.

In the example shown in FIG. 4B, the butting operation is completed in 5 seconds as the standard time and the subsequent searching operation is completed in 5 seconds. In this case, the calculating part 73b of the control device 50 subtracts the required operation time of 5 seconds, which is the elapsed time from the start to the end of the searching operation, from 15 seconds, which is the preset total allowed time of the correcting operation, and calculates the total remaining time of the correcting operation. In this case, the remaining time is 10 seconds.

Then, the comparing part 73c of the control device 50 compares the remaining time of 10 seconds with the required operation time of 5 seconds of the searching operation. As a result, the control part 73d of the control device 50 determines that the remaining time is greater than the required operation time and continues the press-fitting operation.

After that, assuming that the pushing operation is completed in 5 seconds and the biting canceling operation, which is the correcting operation, takes 10 seconds, in this case, the calculating part 73b of the control device 50 subtracts 15 seconds, which is the required operation time of the searching operation and the biting canceling operation, from 15 seconds, which is the preset total allowed time of the correcting operation, and calculates the total remaining time of the correcting operation. In this case, the remaining time is 0 seconds.

Then, the comparing part 73c of the control device 50 compares the remaining time with the required operation time of the searching operation and the biting canceling operation. Since the remaining time is less than the required operation time, the control part 73d of the control device 50 detects an error at the timing T2 shown in FIG. 4B and interrupts the searching operation. As a result, it is possible to prevent an increase in the allowed cycle time.

As shown in FIG. 4C, since minor biting occurs frequently in reality, the above processing is performed in a short cycle. In the case of FIG. 4C, an error is detected at the timing T3 within the allowed cycle time, and the searching operation is interrupted. As a result, it is possible to prevent an increase in the allowed cycle time.

As described above, according to the present embodiment, since an error is determined and the correcting operation is interrupted at the time point when the allowed cycle time is expectedly not reached rather than within a fixed timeout period, it is possible to shorten the cycle time.

In the example described above, the case where the knock pin as the workpiece is press-fit into the cast product has been described, but the disclosure may also be applied to the case where the workpiece is inserted into another part. Also, the disclosure may be applied to the case where a gear is pushed so that teeth of the gears mesh with each other.

The foregoing embodiments are only illustrative and various modifications are possible without departing from the scope of the disclosure. Each of the above embodiments may be established independently, but it is also possible to combine the embodiments. In addition, various features in the different embodiments may also be established independently, but it is also possible to combine the features in the different embodiments.

What is claimed is:

1. A control device of a robot that performs insertion or a press-fitting operation, comprising:
    a measuring part, measuring an elapsed time from a time point of starting a correcting operation in a case where a position of the workpiece in a X direction and in an Y direction does not come to a press-fitting position corresponding to a hole part or a pushing force detected by a force sensor of the robot reaches a preset determination value, wherein the correcting operation includes a searching operation of searching for an insertion position or the press-fitting position, and a biting canceling operation of canceling biting of a workpiece during insertion or press-fitting by swinging the workpiece in at least one of X, Y and Z directions, wherein the press-fitting operation comprises the correcting operation and a pushing operation, and the pushing operation is performed to push the workpiece into the hole part after the correcting operation is completed;
    a calculating part, calculating a total remaining time of the correcting operation by subtracting the elapsed time from a start to an end of one of the searching operation and the biting canceling operation included in the correcting operation from a preset total allowed time of the correcting operation;
    a comparing part, comparing the total remaining time of the correcting operation with a required operation time of the correcting operation, wherein the required operation time of the correcting operation is the elapsed time from the start to the end of a remaining operation included in the correcting operation, wherein the remaining operation includes the other one of the searching operation and the biting canceling operation; and a control part, interrupting the correcting operation and cancelling the remaining operation of the correcting operation before the total allowed time of the correcting operation elapses in a case where the total remaining time of the correcting operation is less than the required operation time of the correcting operation.

2. The control device of the robot according to claim 1, comprising a force sensor, wherein the start and the end of the correcting operation are determined based on a value detected by the force sensor.

3. A control method of controlling a robot that performs insertion or a press-fitting operation, the control method comprising:

a step of measuring an elapsed time from a time point of starting a correcting operation in a case where a position of the workpiece in a X direction and in an Y direction does not come to a press-fitting position corresponding to a hole part or a pushing force detected by a force sensor of the robot reaches a preset determination value, wherein the correcting operation includes a searching operation of searching for an insertion position or the press-fitting position, and a biting canceling operation of canceling biting of a workpiece during insertion or press-fitting by swinging the workpiece in at least one of X, Y and Z directions, wherein the press-fitting operation comprises the correcting operation and a pushing operation, and the pushing operation is performed to push the workpiece into the hole part after the correcting operation is completed;

a step of calculating a total remaining time of the correcting operation by subtracting the elapsed time from a start to an end of one of the searching operation and the biting canceling operation included in the correcting operation from a preset total allowed time of the correcting operation;

a step of comparing the total remaining time of the correcting operation with a required operation time of the correcting operation, wherein the required operation time of the correcting operation is the elapsed time from the start to the end of a remaining operation included the correcting operation, wherein the remaining operation includes the other one of the searching operation and the biting canceling operation; and a step of interrupting the correcting operation and cancelling the remaining operation of the correcting operation before the total allowed time of the correcting operation elapses in a case where the total remaining time of the correcting operation is less than the required operation time of the correcting operation.

* * * * *